United States Patent [19]

Jurski

[11] Patent Number: 5,358,361

[45] Date of Patent: Oct. 25, 1994

[54] QUICK CHANGE SELF-FEED DRILL ASSEMBLY

[75] Inventor: Thomas R. Jurski, Auburn Hills, Mich.

[73] Assignee: GenCorp Inc., Fairlawn, Ohio

[21] Appl. No.: 62,872

[22] Filed: May 17, 1993

[51] Int. Cl.$^5$ .............................................. B23B 45/00
[52] U.S. Cl. ...................................... 408/67; 408/97; 408/130
[58] Field of Search ...................... 408/56, 61, 67, 97, 408/130, 702, 124

[56] References Cited

U.S. PATENT DOCUMENTS

| | | | |
|---|---|---|---|
| 3,596,529 | 8/1971 | Allen | 74/242 |
| 4,184,226 | 1/1980 | Loevenich | 15/415 |
| 4,588,334 | 5/1986 | Khurana | 408/61 |
| 4,770,570 | 9/1988 | Tsui et al. | 408/61 |
| 4,847,979 | 7/1989 | Reed et al. | 29/568 |
| 4,907,660 | 3/1990 | Staggs et al. | 175/320 |
| 4,921,375 | 5/1990 | Famulari | 408/67 |
| 5,033,917 | 7/1991 | McGlasson et al. | 408/67 |
| 5,054,968 | 10/1991 | Eckman | 408/97 |

FOREIGN PATENT DOCUMENTS 16910 1/1988 Japan ..................................... 408/56

*Primary Examiner*—Daniel W. Howell
*Attorney, Agent, or Firm*—Robert F. Rywalski; Larry R. Meenan

[57] ABSTRACT

A self-feed drill assembly (10) for forming an opening within a work piece (20). The drill assembly (10) includes a power driven drill (12) having a rotating cutting element (18) and a mounting fixture (14) for maintaining the relative position of the power driven drill with respect to the work piece (20). The mounting fixture (14) includes a nose piece housing (22), a foot mount housing (24) and a means for releasably joining the nose piece housing and the foot mount housing in an axially coupled position. The nose piece housing (22) defines a first chamber (26) adapted to receive a leading portion of the power driven drill (12) and the foot mount housing (24) defines a second chamber (28) adapted to receive the nose piece housing and in communication with the first chamber such that at least the rotatable cutting element (18) extends through the first chamber, the second chamber and the foot mount housing to contact the work piece (20).

20 Claims, 3 Drawing Sheets

QUICK CHANGE SELF-FEED DRILL ASSEMBLY

FIELD OF THE INVENTION

This invention relates to a quick change self-feed drill assembly. More particularly, this invention relates to a mounting fixture to facilitate the removal and the maintenance of a self-feed air or electric drill from the drill assembly.

BACKGROUND OF THE INVENTION

In the past the removal and the maintenance of self-feed air drills from drill assemblies used for repetitively drilling holes as part of a predetermined manufacturing routine has been a complex and time consuming process. To disassemble and remove a self-feed air drill from a drill assembly a main power air line to the self-feed air drill must be disconnected and then a cycle start signal air line and a retract/emergency-stop air line must be removed. Next, if so equipped, a locational light switch must be disconnected from the self-feed air drill. The locational light switch may be either an air or electric device of a type well known in the art. It will be appreciated that each step in the disassembly of the lines from the drill assembly requires a different size and/or type of tool.

After disassembly of each line from the drill assembly the drill is then removed. Depending on the drill mounting method, the drill may be removed by either removing a lock nut at the face or front of a drill mount, removing bolts that secure the drill mount to a subplate or removing the subplate and drill mount entirely. If either the drill mount or subplate is removed, a minimum of two locating dowel pins also must be extracted. Because the dowel pins are typically not easily accessible and are secured by an interference fit, removal of the dowel pins is very difficult. Furthermore, because the dowel pins are secured by an interference fit, the more frequent the dowel pins are removed the less accurate the interference fit becomes such that drilling reproducibility and accuracy are diminished.

In addition, all of the foregoing steps require the use of a wrench in combination with a tool to "break loose" various retaining bolts and/or nuts to extract the dowel pins. The use of a wrench in combination with a tool to "break loose" the bolts and/or nuts inherently jolts the mounting fixture which effects the position and alignment of the mounting fixture and the drill assembly with respect to the hole to be drilled. As a result, quite often, the location and alignment of the drill assembly must be reset once the drill is reinstalled on the mounting fixture. Accordingly, the disassembly, removal and reinstallation of the drill to the mounting fixture of the drill assembly is a time consuming labor intensive process which may take 4 hours or more to complete.

In view of the foregoing, it will be appreciated that there is a significant need for an improved drill assembly that may be quickly and easily disassembled for purposes of maintenance and/or replacement in the production environment. The present invention provides for the main power, cycle start, emergency start and limit switch lines as an integral part of the mounting fixture thereby simplifying the assembly and disassembly of a drill assembly. Furthermore, the present invention provides a means for releasably removing the drill from the drill mounting fixture such that the use of wrenches and the like are unnecessary thereby reducing the attendant jarring forces typically required to remove the drill and improving drilling accuracy and reproducibility.

SUMMARY OF THE INVENTION

Briefly, according to this invention, there is provided a drill assembly for forming an opening within a work piece. The drill assembly includes a power driven drill having a rotating cutting element and a mounting fixture for maintaining the relative position of the power driven drill with respect to the work piece. The power driven drill may be a self-feed air drill having a chuck to receive the rotating cutting element. The mounting fixture includes a nose piece housing defining a first chamber adapted to receive a leading portion of the power driven drill and a foot mount housing defining a second chamber adapted to receive the nose piece housing. The foot mount housing is releasably fastened to a base for securing the relative position of the power driven drill with respect to the rotating cutting element. The mounting fixture of the drill assembly also includes a means for releasably joining the nose piece housing and the foot mount housing in an axially coupled position to form the mounting fixture. The first chamber of the nose piece housing and the second chamber of the foot mount housing are in communication such that at least the rotatable cutting element extends through the first chamber, the second chamber and the foot mount housing to contact the work piece.

In a preferred embodiment, the second chamber includes a vacuum chamber in communication with a vacuum supply for evacuating cuttings from the vacuum chamber as the drill assembly forms an opening within the work piece.

The nose piece housing of the mounting fixture may include integrally formed conduit means for supplying power and the like to a similar integral conduit means within the foot mount housing.

BRIEF DESCRIPTION OF THE DRAWINGS

Further features and other aspects of the invention will become clear from the following detailed description made with referenced to the drawings in which.

DESCRIPTION OF THE PREFERRED EMBODIMENTS

Figure 1:
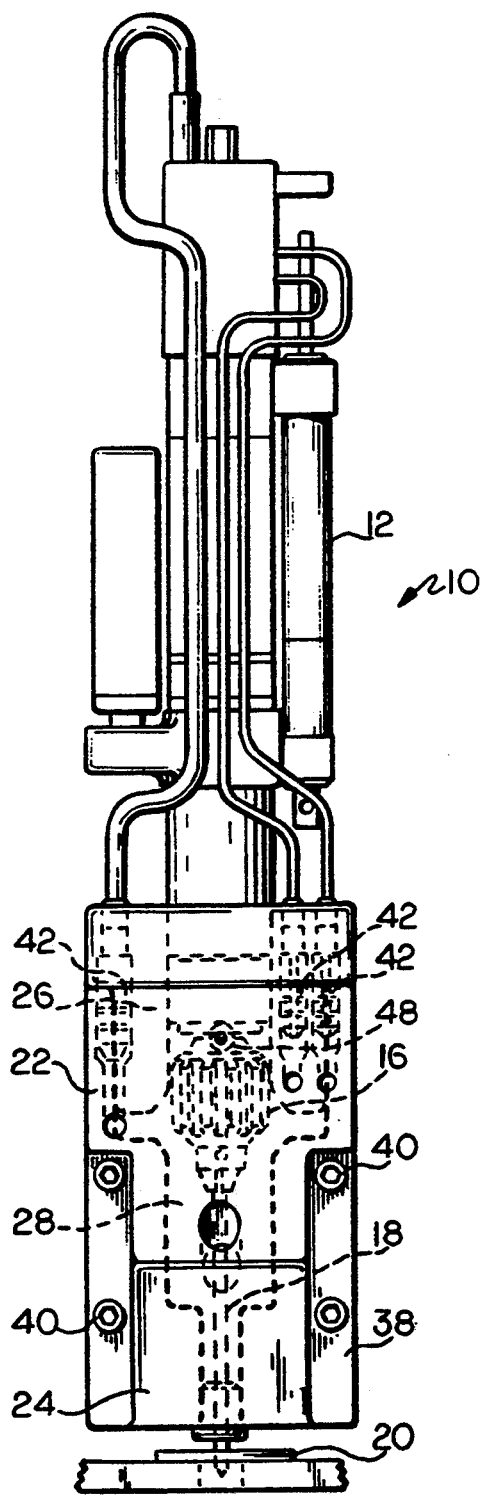
FIG. 1 is a partial cross-sectional top view of a drill assembly in accordance with the present invention.

In the following description, like reference characters designate like or corresponding parts. Also, in the following description it is to be understood that such terms as "forward" and "rearward" and the like are words of convenience employed for describing the positional relationship of the elemental parts of the present invention.

The invention was primarily developed in connection with self-feed air drill assemblies for use in repetitive drilling operations and it is thus described in connection with herein. However, it will be readily apparent that our improved drill mount fixture may be used with equal facility with other types of drill assemblies. Accordingly, the description of the invention in connection with self-feed air drill assemblies is not to be construed as a limitation on the scope of the invention.

Referring to the drawings and in particular to FIGS. 1-5, there is illustrated a drill assembly 10 including a self-feed air drill 12 and a mounting fixture 14. The self-feed air drill 12 includes a chuck 16 and a rotating cutting element such as a drill bit 18 secured therein. The self-feed air drill 12 may be an Aro Bantamatic brand self-feed air drill, Aro Paramatic brand self-feed air drill or an Aro Super Paramatic brand self-feed air drill. For purposes of clarity and conciseness further details of construction of the self-feed air drill 12 are not provided in view of such details being conventional and well within the skill of the art.

As shown in FIGS. 1, 2, 4 and 5 the mounting fixture 14 of the drill assembly 10 is generally of a metallic construction for strength and durability. The mounting fixture 14 may be either machined or cast to a predetermined size and shape such that the mounting fixture is not affected by vibration or internal stresses. The dimensions and tolerances for the manufacture of the mounting fixture 14 may be varied as desired depending upon the diameter of the drill bit 18, dimensions of the front portion of the self-feed air drill 12 and type of work piece 20 to be drilled.

The mounting fixture 14 includes a nose piece housing 22 and a foot mount housing 24 defining a first and second chamber, 26 and 28, respectively. The first and second chamber, 26 and 28, are annular in shape and symmetrical about a longitudinal axis. The first and second chamber 26 and 28 are positioned in communication to provide an opening for passage of the drill bit 18 through the nose piece housing 22 and the foot mount housing 24.

The nose piece housing 22 is attachable to the drill 12 and includes a first chamber 26 of a generally cylindrical shape having a conical forward end 30. The diameter and length of the first chamber 26 is sufficient to receive the chuck 16 of the drill 12 such that the chuck extends beyond the forward end 30 of the nose piece housing 22. The forward end 30 of the nose piece housing 22 matingly engages the rearward end 32 of the foot mount housing 24 such that the first and second chambers 26 and 28 are in communication. Formed integral with the nose piece housing 22 and surrounding the first chamber 26 are conduits 34 terminating in connector plugs 36 for power lines such as a main power line, cycle start line, emergency stop line and limit switch line of a type known in the art.

The foot mount housing 24 is secured to a pedestal 38 for attachment by fasteners 40 such as bolts and the like to a drill stand (not shown) so as to accurately position the drill 12 with respect to the work piece 20. The foot mount housing 24 includes a second chamber 28 also of a generally cylindrical shape extending the longitudinal length of the foot mount housing. The interior diameter of the second chamber 28 is larger than the diameter of the drill bit 18 to form an annular cavity between the drill bit and the interior of the second chamber and permit satisfactory passage of cuttings as the cuttings move up the drill bit. Formed integral with the foot mount housing 24 and extending inward from the rearward end 32 of the foot mount housing around the second chamber 28 are sockets 42 to receive the connector plugs 36 for releasably connecting the power line conduits 34 previously described from the nose piece housing 22 to the foot mount housing 24. In addition to forming a connection between the nose piece housing 22 and the foot mount housing 24 the connector plugs 36 in cooperation with the sockets 42 fix the housings rotationally with respect to one another.

Figure 3:
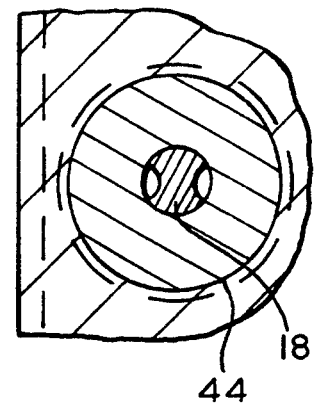
FIG. 3 is an enlarged front view of the drill assembly of FIG. 2 taken along line 3—3.

As shown in FIG. 3, the forward opening of the second chamber 28 of the foot mount housing 24 includes a drill bushing 44 with an interior diameter closely approximating the exterior diameter of the drill bit 18 extending therethrough. The rearward end 32 of the second chamber 28 is of a size and shape to receive the forward end 30 of the nose piece housing 22 to form a generally continuous opening between first and second chambers 26 and 28.

Figure 2:
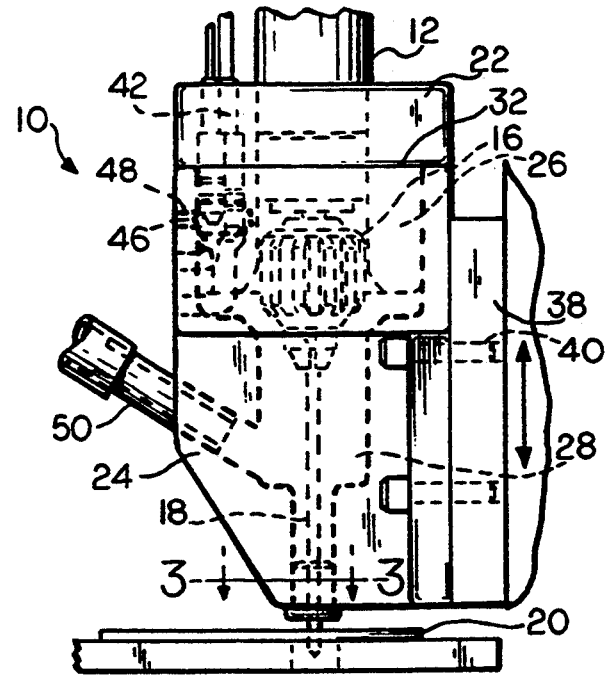
FIG. 2 is an enlarged partial cross sectional side view of the drill assembly of FIG. 1.
Figure 4:
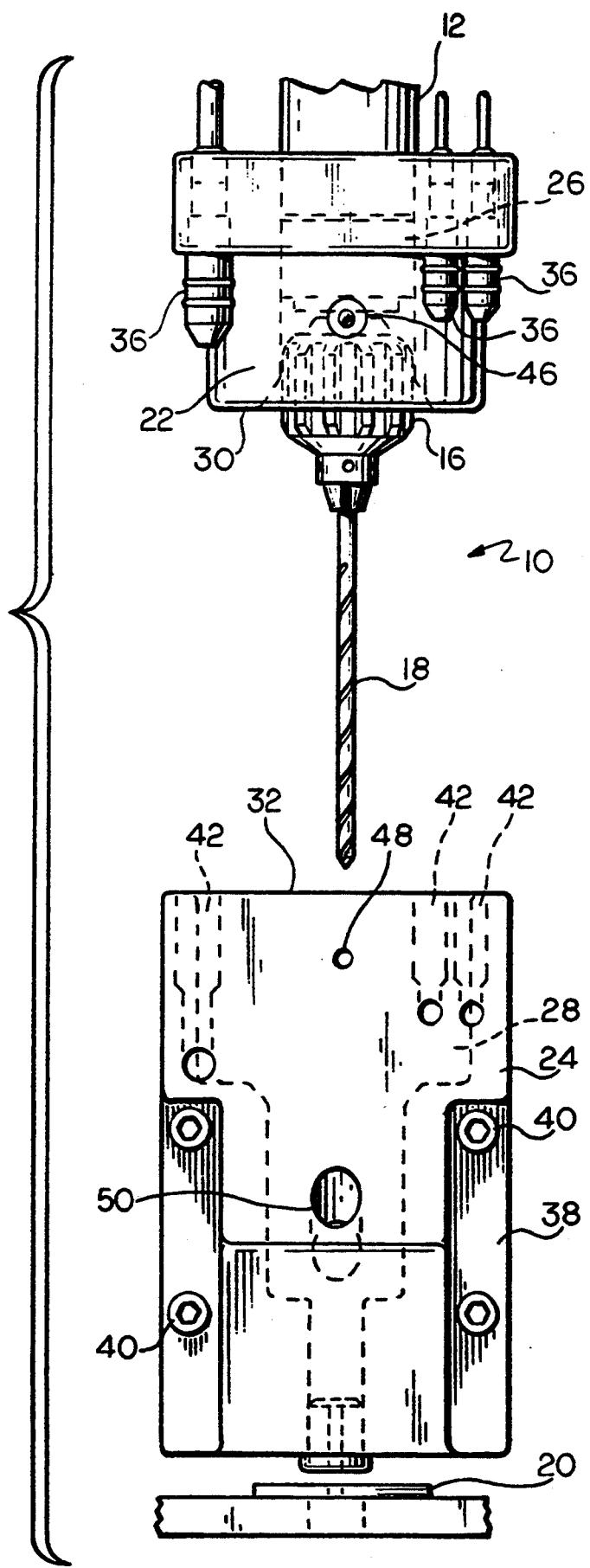
FIG. 4 is an exploded enlarged partial cross sectional top view of the drill assembly of FIG. 2.
Figure 5:
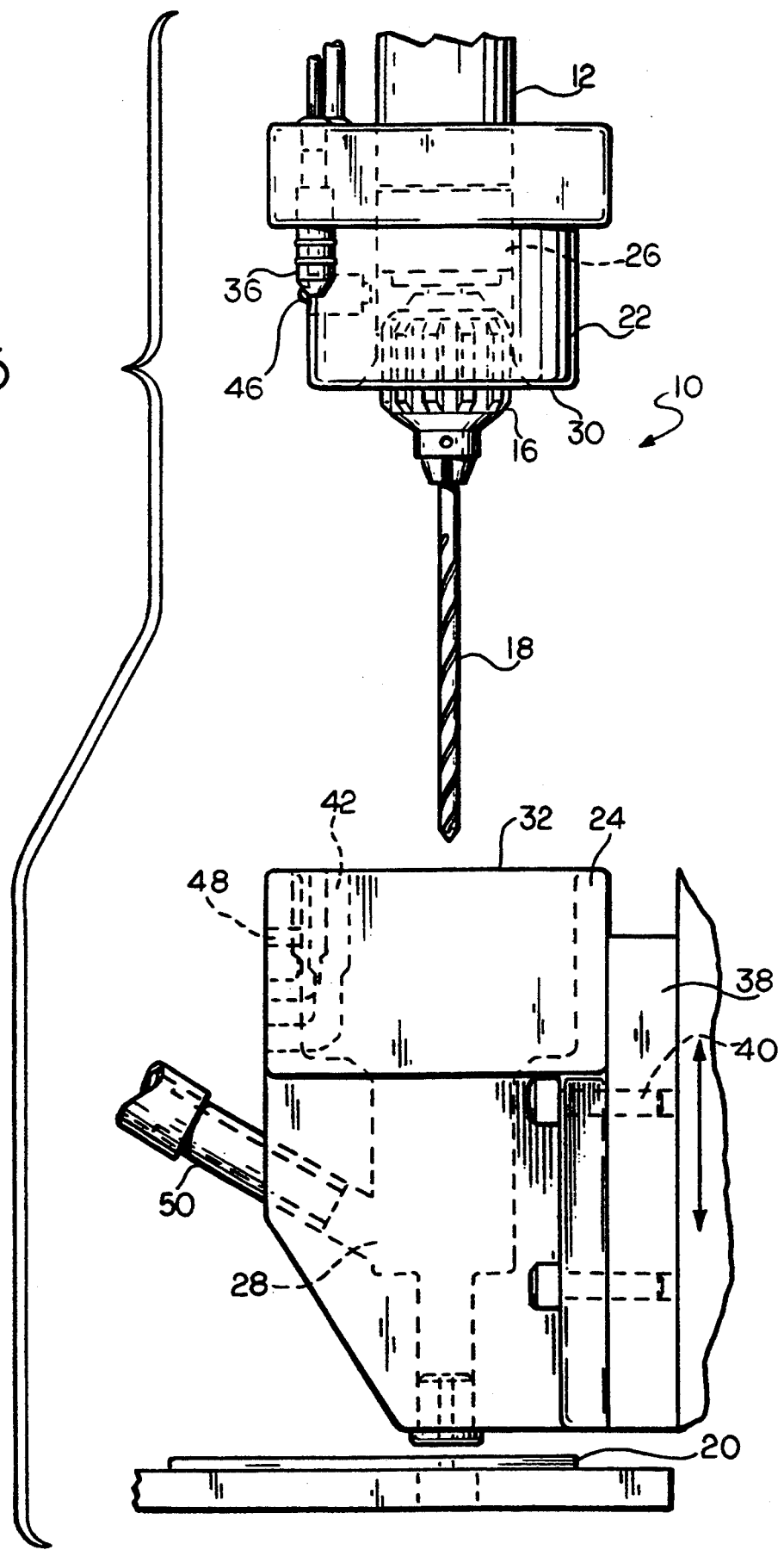
FIG. 5 is an exploded enlarged partial cross sectional side view of the drill assembly of FIG. 2.

The foot mount housing 24 and nose piece housing 22 are releasably joined in an axially coupled relationship. As shown in FIGS. 1 and 2, the mounting fixture nose piece housing 22 includes a detent assembly of a detent member 46 which is concentrically aligned with a complimentary detent opening 48 within the foot mount housing 24. The detent member 46 and detent opening 48 cooperatively maintain the housings 22 and 24 in an abutting relationship. The detent assembly may be most any suitable detent assembly such as a Carrlane styles CL-K, CL-BP or CL-HR detent assembly as obtained from Carrlane of St. Louis, Mo. Although the present invention has been described utilizing a detent assembly it will be appreciated that other releasable joining means such as latch mechanisms or release fasteners may also be employed to releasably join the nose piece housing 22 and the foot mount housing 24 and perform equally as well.

The foot mount housing 24 of the mounting fixture may also include a vacuum tube 50 which is connected to a vacuum source (not shown) for supplying a vacuum to the second chamber 28. The vacuum source creates a vacuum within the foot mount housing 24 to extract drill cuttings from the second chamber 28 around the area where the drill bit 18 contacts the work piece 20 during operation of the drill assembly 10. As shown in FIGS. 2 and 3, the vacuum tube 50 intersects the second chamber 28 thereby making it possible to pull a small amount of air between a drill bushing 44 and the drill bit 18 thereby creating a vacuum venturi which ensures that the airflow and the cuttings are collected and pulled through the flutes of the drill bit to an external container (not shown). Removal of cuttings formed during the drilling process prevents the accumulation of cuttings that may be detrimental to the dimensional repeatability of the drill assembly 10 and prevents the accumulation of cuttings on moving parts which may cause premature failure of the mounting fixture components and/or possibly pose a health hazard when airborne.

The drill 12 may be removed from the foot mount housing 24 of the mounting fixture 14 by manually releasing the detent member 46 from the detent opening 48 and disengaging the connector plugs 36 from the sockets 42. The removed drill 12 may then be repaired or replaced without resetting the drill assembly 10 once the drill is reinstalled on the mounting fixture 14 thereby improving drilling accuracy and reproducibility. In addition, a drill assembly 10 in accordance with the present invention prevents premature wear on certain elements of the drill assembly 10 due to misalignment and/or accumulation of drill cuttings.

Having described presently preferred embodiments of the present invention, it is to be understood that it may be otherwise embodied within the scope of the following claims:

What is claimed is:

1. A self-feed drill assembly for forming an opening within a work piece, said drill assembly comprising:
   a power driven drill having a rotating cutting element;
   a mounting for maintaining the relative position of said power driven drill with respect to the work piece, said mounting including a nose piece housing defining a first chamber adapted to receive a leading portion of said power driven drill; and
   a foot mount housing defining a second chamber adapted to receive said nose piece housing and in communication with said first chamber such that at least said rotatable cutting element extends through said first chamber and said second chamber and foot mount housing to contact the work piece; and
   a means for releasably joining said nose piece housing and said foot mount housing in an axially coupled position, said joining means includes a detent member and detent opening for joining said nose piece housing and said foot mount housing in an axially coupled position.

2. A self-feed drill assembly for forming an opening within a work piece, said drill assembly comprising:
   a power driven drill having a rotating cutting element;
   a mounting for maintaining the relative position of said power driven drill with respect to the work piece, said mounting including a nose piece housing defining a first chamber adapted to receive a leading portion of said power driven drill, said nose piece housing including integrally formed conduit and terminating in connector plugs for power lines; and
   a foot mount housing defining a second chamber adapted to receive said nose piece housing and in communication with said first chamber such that at least said rotatable cutting element extends through said first chamber and said second chamber and foot mount housing to contact the work piece, said foot mount housing including integrally formed conduit in communication with said nose piece conduit through sockets which receive said connector plugs; and
   a means for releasably joining said nose piece housing and said foot mount housing in an axially coupled position.

3. The drill assembly of claim 1 wherein said second chamber includes a vacuum chamber in communication with a vacuum supply for evacuating cuttings from said vacuum chamber as said drill assembly forms an opening within a work piece.

4. The drill assembly of claim 1 wherein said nose piece includes integrally formed conduit.

5. The drill assembly of claim 4 wherein said foot mount housing includes integrally formed conduit in communication with said nose piece conduit.

6. The drill assembly of claim 5 wherein said power driven drill is a self-feed air drill having a chuck to receive said rotating cutting element.

7. The drill assembly of claim 6 wherein said first chamber is an annular chamber of a diameter to receive said chuck of said air drill.

8. The drill assembly of claim 7 wherein said chuck extends longitudinally beyond said first chamber.

9. The drill assembly of claim 8 wherein said vacuum chamber is an annular chamber of a diameter less than said first chamber.

10. The drill assembly of claim 9 wherein said foot mount housing is demountably fastened to a base for securing the relative position of said power driven tool with respect to said rotating cutting element.

11. A mounting for maintaining the relative position of a power driven drill having a rotating cutting element with respect to a work piece, said mounting comprising:
    a nose piece housing defining a first chamber adapted to receive a leading portion of the power driven drill; and
    a foot mount housing defining a second chamber adapted to receive said nose piece housing and in communication with said first chamber such that at least said rotatable cutting element extends through said first chamber and said second chamber and foot mount housing to contact the work piece; and
    a means for releasably joining said nose piece housing and said foot mount housing in an axially coupled position, said joining means includes a detent member and detent opening for joining said nose piece housing and said foot mount housing in an axially coupled position.

12. The drill assembly of claim 2 wherein said joining means includes a detent member and detent opening for joining said nose piece housing said foot mount housing in an axially coupled position.

13. The mounting of claim 11 wherein said second chamber includes a vacuum supply for evacuating cuttings from said second chamber as the power driven drill forms an opening within a work piece.

14. The mounting of claim 13 wherein said nose piece includes integrally formed conduit.

15. The mounting of claim 14 wherein said foot mount housing includes integrally formed conduit in communication with said nose piece conduit.

16. The mounting of claim 15 wherein said power driven drill is a self-feed air drill having a chuck to receive said rotating cutting element.

17. The mounting of claim 16 wherein said first chamber is an annular chamber of a diameter to receive said chuck of said self-feed air drill.

18. The mounting of claim 17 wherein said chuck extends longitudinally beyond first chamber.

19. The mounting of claim 18 wherein said vacuum chamber is an annular chamber of a diameter less than said first chamber.

20. The mounting of claim 19 wherein said foot mount housing is demountably fastened to a base for securing the relative position of said self-feed air drill with respect to said rotating cutting element.

* * * * *